United States Patent
Abrashov et al.

(10) Patent No.: US 10,946,875 B2
(45) Date of Patent: Mar. 16, 2021

(54) METHOD AND DEVICE FOR ASSISTING AN AUTONOMOUS-DRIVE VEHICLE DRIVER, IN PARTICULAR WHEN RESUMING MANUAL CONTROL

(71) Applicants: PSA AUTOMOBILES SA, Poissy (FR); CENTRE NATIONAL DE LA RECHERCHE SCIENTIFIQUE, Paris (FR); INSTITUT POLYTECHNIQUE DE BORDEAUX, Talence (FR); UNIVERSITE DE BORDEAUX, Bordeaux (FR)

(72) Inventors: Sergey Abrashov, Wissous (FR); Francois Aioun, Wissous (FR); Franck Guillemard, Sucy en Brie (FR); Rachid Malti, Bordeaux (FR); Xavier Moreau, Saint Ciers d'abzac (FR)

(73) Assignees: PSA AUTOMOBILES SA, Poissy (FR); CENTRE NATIONAL DE LA RECHERCHE SCIENTIFIQUE, Paris (FR); INSTITUT POLYTECHNIQUE DE BORDEAUX, Talence (FR); UNIVERSITE DE BORDEAUX, Bordeaux (FR)

( * ) Notice: Subject to any disclaimer, the term of this patent is extended or adjusted under 35 U.S.C. 154(b) by 0 days.

(21) Appl. No.: 16/492,550

(22) PCT Filed: Mar. 12, 2018

(86) PCT No.: PCT/FR2018/050572
§ 371 (c)(1),
(2) Date: Sep. 9, 2019

(87) PCT Pub. No.: WO2018/172648
PCT Pub. Date: Sep. 27, 2018

(65) Prior Publication Data
US 2020/0377116 A1    Dec. 3, 2020

(30) Foreign Application Priority Data

Mar. 20, 2017    (FR) .................................... 1752279

(51) Int. Cl.
*B60W 50/14*    (2020.01)
*B60W 60/00*    (2020.01)
(Continued)

(52) U.S. Cl.
CPC .............. *B60W 60/001* (2020.02); *B60J 1/02* (2013.01); *B60W 30/10* (2013.01); *B60W 40/08* (2013.01);
(Continued)

(58) Field of Classification Search
CPC ................................................. B60W 60/001
See application file for complete search history.

(56) References Cited

U.S. PATENT DOCUMENTS

2009/0204326 A1    8/2009    Knee et al.
2014/0371988 A1    12/2014    Muramatsu et al.
(Continued)

FOREIGN PATENT DOCUMENTS

EP    2253529 A2    11/2010
EP    2618108 A1    7/2013
(Continued)

OTHER PUBLICATIONS

International Search Report for PCT/FR2018/050572 dated Jun. 7, 2018.
Opinion for PCT/FR2018/050572 dated Jun. 7, 2018.

*Primary Examiner* — Hovhannes Baghdasaryan
(74) *Attorney, Agent, or Firm* — Sandberg Phoenix & von Gontard, P.C.

(57) ABSTRACT

A method is intended to assist the driver of a vehicle (VA) capable of being driven in an automated manner and in a (Continued)

manual manner, by means of a steering wheel (VV), in a traffic lane (VC1). This method comprises a step that involves determining an optimum trajectory of the vehicle (VA) in the event of automated driving, an actual current trajectory of the vehicle (VA) in the traffic lane (VC1), and a value of a parameter representative of a manual intervention being carried out by the driver on the steering wheel (VV), and representing these determined optimum and actual current trajectories on a medium (EA) with an aspect that depends on this determined value of the parameter.

11 Claims, 2 Drawing Sheets

(51) Int. Cl.
*B60J 1/02* (2006.01)
*B60W 30/10* (2006.01)
*B60W 40/08* (2012.01)
*B62D 1/06* (2006.01)
*B62D 1/16* (2006.01)
*B62D 5/04* (2006.01)

(52) U.S. Cl.
CPC ............... *B60W 50/14* (2013.01); *B62D 1/06* (2013.01); *B62D 1/16* (2013.01); *B62D 5/0463* (2013.01)

(56) References Cited

U.S. PATENT DOCUMENTS

2017/0235306 A1* 8/2017 Seki ...................... B60W 40/08
  701/23
2018/0215396 A1* 8/2018 Miyahara ............ B60W 50/082

FOREIGN PATENT DOCUMENTS

FR  3048943 A1  9/2017
FR  3049106 A1  9/2017

* cited by examiner

METHOD AND DEVICE FOR ASSISTING AN AUTONOMOUS-DRIVE VEHICLE DRIVER, IN PARTICULAR WHEN RESUMING MANUAL CONTROL

CROSS-REFERENCE TO RELATED APPLICATIONS

This application is the US National Stage under 35 USC § 371 of International Application No. PCT/FR2018/050572, filed 12 Mar. 2018 which claims priority to French Application No. 1752279 filed 20 Mar. 2017, both of which are incorporated herein by reference.

BACKGROUND

The invention relates to autonomous-drive vehicles, possibly of the automobile type, and more specifically the assistance that is intended to help drivers of such vehicles to drive the them.

It will be noted here that the term "autonomous-drive vehicle" means a vehicle that can be driven in an automated manner (and therefore without the intervention of its driver) during a self-driving phase or in a manual manner (and therefore with the intervention of its driver on the steering wheel) during a manual driving phase.

As known to those skilled in the art, some vehicles, generally of the automobile type, comprise an assistance device for controlling their positioning relative to the direction transverse to the road and to drive them temporarily without their driver acting on the steering wheel or on a pedal.

This type of assistance device provides control of the vehicle based, in particular, on information relating to the external environment of the vehicle and provided at least by means of analysis of the embedded external environment. To do this, the assistance device continuously determines the optimum trajectory of the vehicle in the context of automated driving, and, during each self-driving phase, it verifies the steering wheel angle and the speed of the vehicle so that the latter best follows the determined optimum trajectory.

It has been proposed, in particular in the US Pub. No. 2014/371988, to display the determined optimum trajectory on a screen of the vehicle, so that the driver of the vehicle is, if desired, informed of the best trajectory to follow. Such a display reassures the driver during a self-driving phase, because it proves to the driver that the assistance device properly performs its task. However, it does not allow the driver, during a manual driving phase, to know if the trajectory the driver imposes on the vehicle is similar to the optimum trajectory displayed.

It has also been proposed in the aforementioned US Pub. No. 2014/371988 to concurrently display, during a manual driving phase, the actual current trajectory of the vehicle alongside the optimum trajectory. However, when the driver resumes control of the vehicle following a self-driving phase, this simultaneous display of the optimum and effective trajectories does not allow the driver to determine the share of the driver's manual intervention (or what amounts to the same, the share of intervention of the assistance device) in the effective control of the vehicle. In other words, the driver does not know at all if the driver controls the vehicle all alone or if the assistance device participates, at least partially, in this control. This situation can be dangerous because the assistance device may have decided to no longer participate in the control of the vehicle at a time in which the driver believes that it is still the case, and therefore, is not completely focused on manual driving.

SUMMARY

The purpose of the invention is, in particular, to improve this situation.

A method is disclosed, on the one hand, to assist a driver of a vehicle able to be driven in an automated manner and in a manual manner, by means of a steering wheel, in a traffic lane, and on the other hand, comprising a step in which an optimum trajectory of the vehicle is determined in the event of automated driving and an effective current trajectory of the vehicle is determined in a traffic lane.

This assistance method is characterized in that in its step:
a value of a parameter representative of a current manual intervention being carried out by the driver on the steering wheel is also determined, and
the optimum trajectory and actual current trajectory, determined with an aspect that is a function of this determined value of the parameter, are shown on a display medium.

With this dual trajectory display with an aspect that depends on the current manual intervention being carried out by the driver on the steering wheel, the driver is now informed, when resuming control of the vehicle, of the driver's share of manual intervention (or the share of intervention of the assistance device, which amounts to the same) in the effective control of the vehicle.

The assistance method may comprise other features that may be included separately or in combination, and in particular:
in its step, the aspect may be a level of transparency which depends on the determined value of the parameter;
in its step, it is possible to use a maximum level of transparency when the determined value of the parameter exclusively represents a current manual intervention being carried out by the driver on the steering wheel without automated driving, and it is possible to use a minimum level of transparency when the determined value of the parameter represents exclusively automated driving without any manual intervention being carried out by the driver on the steering wheel;
in its step, the maximum level of transparency may correspond to total invisibility of the determined optimum trajectory and actual current trajectory;
as a variant, in its step, when the determined value of the parameter represents exclusively a manual intervention being carried out by the driver on the steering wheel without automated driving, it is possible to progressively increase the level of transparency of a first maximum value, corresponding to a partial invisibility of the determined optimum trajectory and actual current trajectory, up to a second maximum value, corresponding to a total invisibility of the determined optimum trajectory and actual current trajectory;
in its step, when the vehicle comprises a steering column operable by the steering wheel and by a motor able to produce steering torque assistance, it is possible to determine a reference angle imposed on the steering wheel so that the vehicle follows the optimum trajectory as a function of information that is representative of the vehicle and of an environment thereof, then a steering torque assistance that is to be produced as a function of the current angle of the steering wheel and of the determined reference angle, then the value of the parameter can be determined as a function of this determined steering torque assistance;

in its step, the lower the determined steering torque assistance, the greater the likelihood the value of the parameter can be representative of a high manual intervention being carried out by the driver on the steering wheel;

in its step, it is possible to show the determined optimum trajectory and actual current trajectory by displaying different lines on a display medium which is selected from among a display screen fitted to the vehicle and a windshield of the vehicle;

as a variant, in its step, it is possible to show the determined optimum trajectory and actual current trajectory by projecting different lines on the traffic lane which then constitutes the display medium.

The invention also proposes a device, on the one hand, intended to assist a driver of a vehicle able to be driven in an automated and manual manner, by means of a steering wheel, on a traffic lane, and, on the other hand, comprising calculation means able to determine an optimum trajectory of the vehicle in the case of automated driving and an actual current trajectory of the vehicle in this traffic lane.

This assistance device is characterized in that its means of calculation are also suitable for determining a value of a parameter representative of a current manual intervention being carried out by the driver on the steering wheel, and to show on a display medium the determined optimum trajectory and actual current trajectory determined with an aspect that depends on this determined value of the parameter.

The invention is particularly well suited, although not limited to the case where the autonomous or partially autonomous vehicle is an automobile.

DESCRIPTION OF THE FIGURES

Other features and advantages of the method will appear on examining the detailed description below, and the attached drawings, in which.

DETAILED DESCRIPTION

The invention aims in particular to provide a method of assistance, and an associated assistance device DA for assisting a driver of an autonomous-drive vehicle VA to drive the autonomous-drive vehicle.

It is recalled here that the term "autonomous-drive vehicle" is understood to mean a vehicle that can be driven in an automated manner (and therefore without the intervention of its driver) during a self-driving phase, under the control of an assistance device, or in a manual manner (and therefore with intervention of its driver on the steering wheel) during a manual driving phase.

In the following, and by way of a non-limiting example, the autonomous-drive vehicle VA is considered to be an automobile. This may be a car, for example. However, the method is not limited to this type of vehicle. Indeed, the method can be used with any type of autonomous-drive vehicle that can drive on terrestrial traffic lanes.

Figure 1:
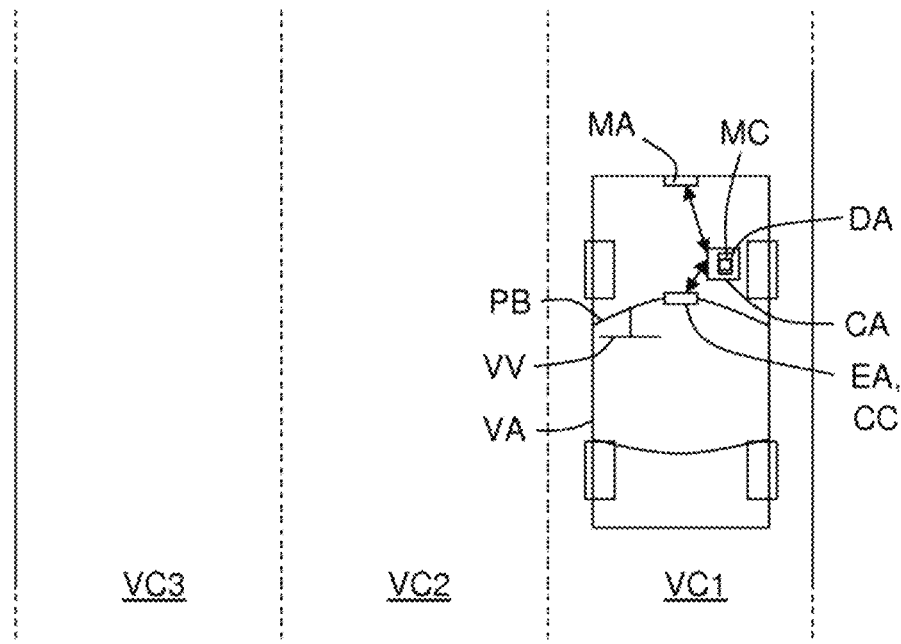
FIG. 1 schematically and functionally illustrates a road comprising three traffic lanes, on one of which an example of an autonomous-drive vehicle is driving, and comprising means for analyzing the environment and a computer equipped with an exemplary embodiment of an assistance device, FIG. 2 schematically illustrates an exemplary algorithm implementing an assistance method, and FIG. 3 schematically illustrates an exemplary image displayed on the screen of the central screen of the vehicle of FIG. 1 at a given point in time.

FIG. 1 schematically and functionally shows a road comprising three traffic lanes VCj (j=1 to 3), on one of which an autonomous-drive vehicle VA is driving. Here the vehicle VA is traveling in the first traffic lane VC1.

Since the vehicle VA is an autonomous-drive vehicle, it comprises in particular means for analyzing the environment MA and a assistance device DA, acting on its steering wheel VV.

Although this does not appear in FIG. 1, the steering wheel VV is fixedly attached to a steering column, to allow the driver to control it. This steering column is also controllable by an electric motor driven by the assistance device DA and, for example, part of a power steering device.

This assistance device DA is indeed responsible for controlling the positioning of the vehicle VA relative to the direction Y that is transverse to the road and driving it without its driver acting on the steering wheel or a pedal. This control is provided by control means MC based, in particular, on information related to the external environment of the vehicle, provided at least by the means of analysis MA of the embedded external environment. It comprises, for example, what the person skilled in the art calls an Advanced Driver Assistance System (ADAS).

The steering wheel VV allows the driver of vehicle VA to exert torque $T_C$ on the steering column with at least one of their hands.

Note that a sensor is coupled to the steering column to measure the steering wheel angle $\theta_V$.

The electric motor is responsible for applying a steering torque assistance $T_A$ to the steering column when it receives the order for it from the assistance device DA. For this purpose, the assistance device DA can determine a reference angle $\theta_{ref}$ that the steering wheel VV should take to have the vehicle VA follow an optimum trajectory TO, based on the information that is representative of the vehicle VA and of its environment.

The representative information of the vehicle VA can, for example, be provided by a computer embedded in the vehicle VA and responsible for analyzing its dynamics. For example, this information may be representative of the current geographical position of the vehicle VA and/or the current speed of the vehicle VA and/or the current acceleration of the vehicle VA.

The information that is representative of the environment of the vehicle VA is determined by the analysis means MA. It should be noted that the analysis means MA must determine at least the lay-out of the traffic lane VCj in which the vehicle VA is driving. Therefore, it comprises at least one camera, able to acquire digital images of the environment located at least in front of the vehicle VA and associated with a digital image analyzer comprising shape recognition means. But it may also include ultrasonic sensors and/or at least one scanning laser and/or at least one radar or lidar, in particular for the detection of obstacles in the environment of the vehicle VA.

The assistance device DA can, for example, determine the steering torque assistance $T_A$ that the electric motor must produce, as a function of the current steering wheel angle $\theta_V$ (measured by the sensor coupled to the steering column) and the reference angle $\theta_{ref}$ (which it has just determined). It will be understood that the steering torque assistance $T_A$ depends on the torque $T_C$ applied by the driver, and therefore on the angle of the steering wheel $\theta_V$.

As mentioned above, the assistance method is intended, in particular, to assist the driver of vehicle VA to drive the vehicle.

Figure 3:
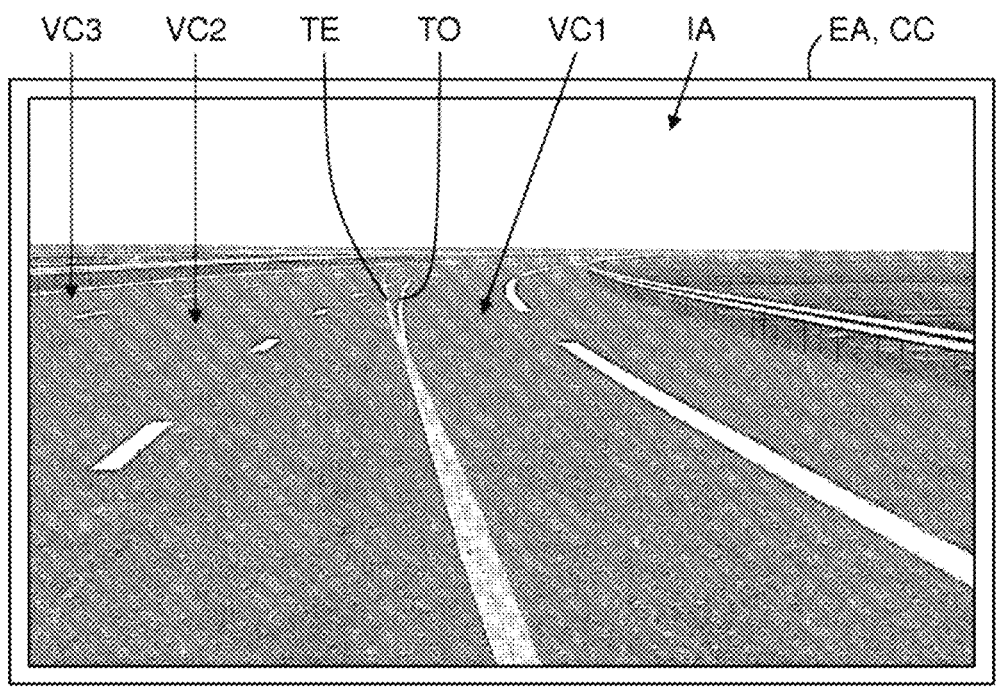

The assistance method comprises an initial step for determination of an optimum trajectory TO of the vehicle VA in the event of automated driving (and therefore without intervention of its driver) and an actual current trajectory TE of the vehicle VA in the traffic lane VCj it is following (see FIG. 3).

These determinations of the optimum trajectory TO and actual trajectory TE are carried out by the assistance device DA embedded in the vehicle VA, and more precisely by the calculation means MC comprised in this assistance device DA and which are arranged for this purpose.

Figure 2:
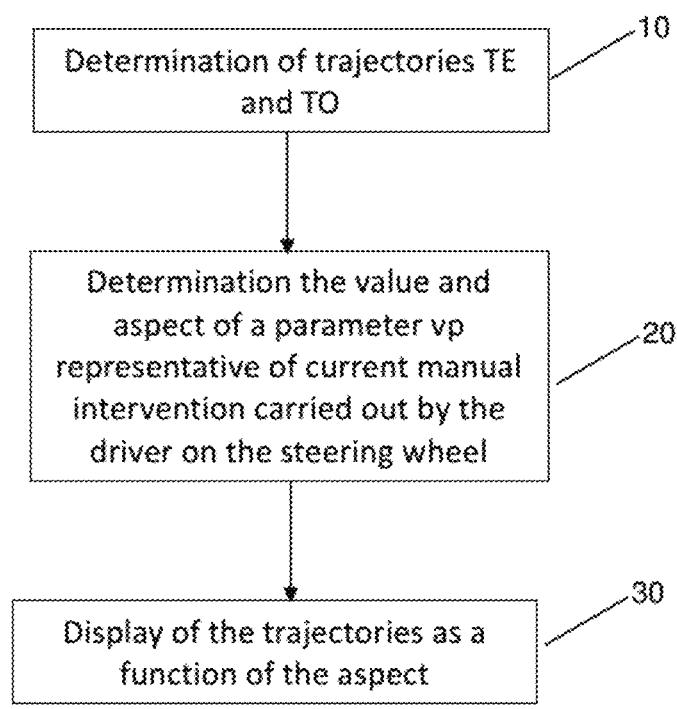

In the non-limiting example of an algorithm illustrated in FIG. 2 and implementing the assistance method, the determinations of the optimum trajectory TO and actual trajectory TE are carried out in sub-step 10.

It will be noted that in the example shown in a non-limiting manner in FIG. 1, the assistance device DA is located in a computer CA of the vehicle VA which can possibly provide at least one other function. But it could comprise a computer. Therefore, an assistance device DA can be realized in the form of software modules (or computer modules, i.e., software), of circuits or of electrical or electronic components (i.e., hardware), or a combination of electrical or electronic circuits or components and software modules.

Any technique known to those skilled in the art, for determining the optimum trajectory TO of the vehicle VA and the current (and therefore real) actual trajectory TE of the vehicle VA, can be used here.

For example, the optimum trajectory TO can be determined from the reference angle $\theta_{ref}$ of the steering wheel VV, and the actual trajectory TE can be determined from the measured (and therefore effective) angle $\theta_V$ of the steering wheel VV.

These trajectories TO and TE are determined by N future positions $p_n$ (with n=1 to N) of a point representative of the vehicle VA, driving at speed v (for example, considered to be constant for the N positions) and having a steering wheel angle $\theta_v$ (for example, considered to be constant for the N positions). Each future position $p_n$, in an XY plane and corresponding to a point in time dt, is then situated at a distance n*dt*v/3.6 from the current position of the point representing the vehicle VA (if v is given in km/h). The X direction is the longitudinal direction of the road and the Y direction is the transverse direction of the road. It is then possible to use a bicycle-type model for the vehicle VA, defined by the following equations:

$$\begin{cases} \dot{v}_y = \frac{C_f + C_r}{v_x M} v_y + \left(\frac{aC_f - bC_r}{v_x M} - v_x\right)\dot{\varphi} - \frac{C_f}{Mn}\theta_v \\ \ddot{\varphi} = \frac{aC_f - bC_r}{v_x I} v_y + \frac{a^2 C_f + b^2 C_r}{v_x I}\dot{\varphi} - \frac{aC_f}{In}\theta_v \\ \dot{x} = v_x\cos(\varphi) - v_y\sin(\varphi) \\ \dot{y} = v_x\sin(\varphi) + v_y\cos(\varphi) \end{cases}$$

where (x, y) are the overall coordinates of the vehicle, (a, b) are the distances between the center of gravity of the vehicle VA and the front and rear axles respectively, M is the mass of the vehicle VA, ($C_f$, $C_r$) are the connection coefficients between the tires and the ground, I is the inertia of the vehicle VA, n is the steering gain between the wheels of the vehicle VA and the steering wheel VV, ($v_x$, $v_y$) are the longitudinal and transverse speeds in a reference associated with the vehicle VA, and $\varphi$ is a yaw angle of the vehicle VA.

The parameters of the vehicle VA (a, b, M, $C_f$, $C_r$, I, n, vx, vy, $\varphi$) are assumed to be known. Furthermore, it is assumed that at the given time t0, in the reference set to the center of gravity of the vehicle VA and not moving with the vehicle VA, the yaw angle $\varphi$ remains small for the duration ts=N*dt and that the velocities $v_y$ (t0) and $\dot{\varphi}$ (t0) are zero to avoid the impact of the initial conditions (it is however possible to use the value of $\dot{\varphi}$ (t0) measured by an embedded yaw speed sensor to improve the quality of the trajectory prediction, especially in the case of a major turn). Under these conditions, the model of vehicle VA becomes the following linear model:

$$\begin{bmatrix} \dot{v}_y \\ \ddot{\varphi} \\ \dot{\varphi} \\ \dot{y} \end{bmatrix} = \underbrace{\begin{bmatrix} \frac{C_f + C_r}{v_x M} & \left(\frac{aC_f - bC_r}{v_x M} - v_x\right) & 0 & 0 \\ \frac{aC_f - bC_r}{v_x I} & \frac{a^2 C_f + b^2 C_r}{v_x I} & 0 & 0 \\ 0 & 1 & 0 & 0 \\ 1 & 0 & v_x & 0 \end{bmatrix}}_{A} \begin{bmatrix} v_y \\ \dot{\varphi} \\ \varphi \\ y \end{bmatrix} + \underbrace{\begin{bmatrix} -\frac{C_f}{Mn} \\ -\frac{aC_f}{In} \\ 0 \\ 0 \end{bmatrix}}_{B} \theta.$$

If it is now assumed that the velocity $v_x$ remains constant during N*dt, the last model of vehicle VA becomes a linear state representation of the form sX=AX+B$\theta$; y=CX, where C=[0 0 0 1] and s is a Laplace operator replacing the derivation.

This state representation is in "continuous time". Therefore, to obtain the state representation equivalent to "discrete time", we can use the Tustin transformation: s=(2/dt)*[(1−$z^{-1}$)/(1+$z^{-1}$)], where $z^{-1}$ is the delay operator. The discrete state representation then has the following form: X(k+1)=$A_d$X(k)+$B_d\theta$(k); y(k)=$C_d$X(k). The coordinates of the N future positions $p_n$ of the trajectory are then given by:

$$X_{ref} = \{x_1, x_2, x_3, \ldots, x_N\}, Y_{ref} = \{y_1, y_2, y_3, \ldots, y_N\},$$

$$x_i = i \times dt \times \frac{v_x}{3.6}, \; y_i = C_d\left(\sum_{j=0}^{i-1} A_d^j\right)B_d\theta.$$

Here, we calculate the coordinates of the $p_n$ in the reference that corresponds to the reference of the vehicle at time t0. However, it is possible that the materialization of the trajectories TO and TE requires global coordinates. These can be deduced by performing the basic change:

$$\begin{bmatrix} x' \\ y' \end{bmatrix} = \begin{bmatrix} \cos\phi & \sin\phi \\ -\sin\phi & \cos\phi \end{bmatrix}\begin{bmatrix} x - x_0 \\ y - y_0 \end{bmatrix},$$

where $\phi$ is the yaw angle in a new global reference and the coordinates ($x_0$, $y_0$) are the coordinates of the center of gravity of the vehicle VA at time t0, expressed in the new global reference, and (x', y') are the new coordinates of a position $p_n$.

By way of example, the number N of positions $p_n$ contained in a trajectory TO or TE can be between three and ten. For example, N can be equal to five.

Also by way of example, the time interval dt may be between 0.2 s and 0.6 s. For example, dt may be equal to 0.4 s.

In the step of the method, in addition to the optimum trajectory TO and the effective trajectory TE, the calculation means MC determine a value vp of a parameter representative of a current manual intervention being carried out by the driver on the steering wheel VV. This determination is made in sub-step 20 of the algorithm of FIG. 2.

Then, the optimum trajectory TO and actual current trajectory TE are shown on a display medium EA with an aspect that depends on the determined value of the parameter. This showing of the trajectories is triggered by the calculation means MC and performed in the sub-step 30 of the algorithm of FIG. 2.

Note that the showing of the determined optimum trajectory TO and actual trajectory TE can be accomplished in different ways.

Thus, it can be done by displaying different lines on a display medium EA which is selected from a display screen equipping the vehicle VA and a windshield of the vehicle VA. In the non-limiting example shown in FIGS. 1 and 3, the display is accomplished by displaying of images IA on a screen EA of the central screen CC located in (or on) the dashboard PB of the vehicle VA. Alternatively or in addition, it could be accomplished by displaying images IA on a screen of the vehicle dashboard VA or on the windshield when the vehicle VA has a "head up" display device.

In a non-illustrated embodiment, the display of the determined optimum trajectory TO and actual current trajectory TE can be done by projection of different lines on the traffic lane VCj which then constitutes the display medium EA. This projection can be done by means of at least one light projector or an optical device (such as a laser grid), installed in the front part of the vehicle VA. Such a light projector may, possibly, be part of an optical unit (headlight or front light) of the vehicle VA.

This dual display of the optimum trajectory TO and actual trajectory TE according to an aspect that depends on the current manual intervention being carried out by the driver on the steering wheel VV, very advantageously makes it possible to inform the driver, when resuming control of the vehicle VA, not only of the influence of their manual action on the actual trajectory TE, but also on the share of their manual intervention (or that which amounts to the same, the share of the intervention of the assistance device DA) in the actual control of the vehicle VA.

Therefore, the driver knows whether he controls the vehicle VA or if the assistance device DA participates at least partially in this control. This avoids the driver finding himself in a situation in which the assistance device DA has decided to no longer participate in the control of the vehicle VA at a time when the driver believes that it is still the case, or rather to not contradict the assistance device DA when the assistance device DA has not yet stopped controlling the vehicle VA but the driver has already put his hands on the steering wheel VV.

Note that the determinations and showing of the trajectories can be carried out periodically, for example every half-second or second, at least as long as the determined value of the parameter vp does not represent exclusively a manual intervention being carried out by the driver on the steering wheel VV.

For example, in the method step the appearance of the optimum trajectory TO and actual trajectory TE may be a level of transparency which is a function of the determined value of the parameter vp (by the computing means MC).

In this case, in the method step, the calculation means MC can use a maximum level of transparency when the determined value of the parameter vp exclusively represents a current manual intervention being carried out by the driver on the steering wheel VV without automated driving, and the computing means MC may use a minimum level of transparency when the determined value of the parameter vp exclusively represents automated driving without any manual intervention being carried out by the driver on the steering wheel VV.

It should be noted that this maximum level of transparency can, for example, correspond to a total invisibility of the determined optimum trajectory TO and actual current trajectory TE. In this case, when the determined value of the parameter vp indicates that only the driver is acting on the steering wheel VV, none of the optimum trajectory TO and actual trajectory TE is materialized on the display medium EA. For example, this maximum level of transparency can be equal to a transparency of 100%. Also for example, the minimum level of transparency can be equal to 0% transparency.

In an alternative embodiment, when the determined value of the parameter vp exclusively represents a then current manual intervention being carried out by the driver on the steering wheel VV without automated driving, the computing means MC can gradually increase the level of transparency of a first maximum value, corresponding to partial invisibility of the determined optimum trajectory TO and actual current trajectory TE, up to a second maximum value, corresponding to a total invisibility of the determined optimum trajectory TO and actual current trajectory TE. In this case, when the determined value of the parameter vp indicates that only the driver is acting on the steering wheel VV, the optimum trajectory TO and actual trajectory TE are shown on the display medium EA according to the first maximum value of the level of transparency, then the level progressively increases until the optimum trajectory TO and actual trajectory TE are not materialized at all on the display medium EA. For example, the first maximum value of the level of transparency may be equal to 90% transparency and the second maximum value of the level of transparency may be equal to 100% transparency.

For example, it is possible to use an exponential growth of the transparency.

In the augmented reality image IA, which is displayed in FIG. 3 by way of a non-limiting example, the driver can observe, on the one hand, that the optimum trajectory TO and actual trajectory TE are almost identical in the very short term, but that they differ slightly in the display medium term, and on the other hand, that the level of transparency is intermediate. Consequently, the driver can immediately deduce, on the one hand, that the assistance device DA continues to partially control the steering column with them, and, on the other hand, that they are not applying sufficient torque to the steering wheel VD (and more precisely that they are not steering sufficiently).

Note that aspects other than the level of transparency can be used to represent the share of the then current manual intervention being carried out by the driver on the steering wheel VV. Thus, it is possible to use varying levels of gray (from black to very light gray, for example), or different colors, or different trajectory widths (ranging from very wide to very fine, for example), or even tracings having different aspects (from continuous to dotted, or from continuous to dashes that are ever more spaced out, for example). It is also possible to combine at least two different aspects for the display of the trajectories TO and TE as a function of vp.

Note also that any technique known to those skilled in the art and allowing for the determination of the value of the parameter vp which represents the then current manual intervention being carried out by the driver on the steering wheel VV (or what amounts to the same share of intervention of the assistance device DA), can be used by the calculation means MC.

Thus, in the method step, when, as mentioned above, the vehicle VA comprises a steering column operable by the steering wheel VV and by a motor capable of producing a steering torque assistance $T_A$, the calculation means MC can begin by determining the reference angle $\theta_{ref}$ imposed on the steering wheel VV so that the vehicle VA follows the optimum trajectory TO according to information representative of the vehicle VA and its environment. Then, the calculation means MC can determine a steering torque assistance $T_A$, to produce as a function of the current steering wheel angle $\theta_V$ and the determined reference angle $\theta_{ref}$. Then, the calculation means MC can determine the value of the parameter vp as a function of this determined steering torque assistance $T_A$.

In this case, in the step of the method, the lower the determined TA steering torque assistance, the more the value of the parameter vp can, for example, be representative of a high manual intervention being carried out by the driver on the steering wheel VV (or which amounts to the same as a weak intervention of the assistance device AD).

However, other techniques can be used, including techniques using the measurements made by capacitive sensors located on the steering wheel VV, or techniques described in patent documents FR 2016/52243 (published as FR3049106) and FR 2016/52244 (published as FR3048943).

It should also be noted that the method is not only useful when the driver regains control of the vehicle following a self-driving phase. Indeed, it is also useful during a self-driving phase, because the optimum trajectory TO and actual trajectory TE are shown with an aspect representative of this total autonomy and are normally almost superimposed, thus allowing the driver to verify if the action of the assistance device DA is correct on the vehicle VA. It can be envisaged that the driver chooses a mode of operation in which the optimum trajectory TO and actual trajectory TE are newly shown a few moments (for example, five or ten seconds) after they have effectively and permanently fully regained control of the vehicle VA. For example, the driver may have the option to enable or disable the assistance device DA at any time. This latter option is intended to enable the driver to compare the actual trajectory TE that they impose on the vehicle VA to the optimum trajectory TO which is determined by the assistance device DA.

The invention claimed is:

1. A method for assisting a driver of a vehicle capable of being driven in a traffic lane in a manual manner and an automated manner by means of a steering wheel, said method comprising:
   determining an optimum trajectory of said vehicle when said vehicle is being driven in said automated manner and an actual current trajectory of said vehicle in said traffic lane,
   determining a value of a parameter (vp) representative of an amount of then current manual intervention of said driver on said steering wheel, and
   said displaying said determined optimum trajectory and actual current trajectory on a display medium with an aspect based on the determined value of the parameter (vp);
   wherein, said aspect is a level of transparency determined as a function of said determined value of the parameter (vp);
   wherein a maximum level of transparency is used when said determined value of the parameter (vp) represents current exclusive manual intervention of said driver on said steering wheel without automated driving, and a minimum level of transparency is used when said determined value of the parameter (vp) represents exclusively an automated driving without any manual intervention of said driver on said steering wheel;
   wherein said maximum level of transparency corresponds to total invisibility of said determined optimum trajectory and actual current trajectory.

2. A method for assisting a driver of a vehicle capable of being driven in a traffic lane in a manual manner and an automated manner by means of a steering wheel, said method comprising:
   determining an optimum trajectory of said vehicle when said vehicle is being driven in said automated manner and an actual current trajectory of said vehicle in said traffic lane,
   determining a value of a parameter (vp) representative of an amount of then current manual intervention of said driver on said steering wheel, and
   said displaying said determined optimum trajectory and actual current trajectory on a display medium with an aspect based on the determined value of the parameter (vp);
   wherein, said aspect is a level of transparency determined as a function of said determined value of the parameter (vp);
   wherein a maximum level of transparency is used when said determined value of the parameter (vp) represents current exclusive manual intervention of said driver on said steering wheel without automated driving, and a minimum level of transparency is used when said determined value of the parameter (vp) represents exclusively an automated driving without any manual intervention of said driver on said steering wheel;
   wherein when said determined value of the parameter (vp) represents a then current exclusive manual intervention of said driver on said steering wheel without automated driving, said level of transparency is progressively increased from a first maximum value, corresponding to a partial invisibility of said determined optimum trajectory and actual current trajectory, up to a second maximum value, corresponding to a total invisibility of said determined optimum trajectory and actual current trajectory.

3. The method according to claim 1, wherein when said vehicle comprises a steering column operable by said steering wheel and by a motor capable of producing a steering torque assistance, said method comprising a step of determining a reference angle imposed on said steering wheel so that said vehicle follows said optimum trajectory based on information representative of said vehicle and an environment of said vehicle, and a step of determining a steering torque assistance to be produced as a function of a then current angle of the steering wheel and of said determined reference angle, said value of the parameter (vp) being determined as a function of said determined steering torque assistance.

4. The method according to claim 3, wherein the value of the parameter (vp) is inversely proportional to the determined steering torque assistance, such that the lower the determined steering torque assistance, the greater the said value of the parameter (vp).

5. The method according to according to claim 1, wherein said determined optimum trajectory and actual current trajectory are shown by displaying different lines on said display medium, said display medium being selected from a display screen of said vehicle and a windshield of said vehicle.

6. The method according to claim 1 wherein said determined optimum trajectory and actual current trajectory are shown by projecting different lines on said traffic lane which then comprises said display medium.

7. A device for assisting a driver of a vehicle able to be driven in a traffic lane in an automated manner or in a manual manner, by means of a steering wheel, said device comprising calculation means able to determine an optimum trajectory of said vehicle in the case of automated driving and an actual current trajectory of said vehicle in said traffic lane, wherein said calculation means is also able to determine a value of a parameter (vp) representative of an amount of current manual intervention of said driver on said steering wheel, and to display on a display medium (EA) said determined optimum trajectory and actual current trajectory with an aspect, said value of said aspect being determined as a function of value of the parameter (vp);

wherein, said aspect is a level of transparency determined as a function of said determined value of the parameter (vp);

wherein a maximum level of transparency is used when said determined value of the parameter (vp) represents current exclusive manual intervention of said driver on said steering wheel without automated driving, and a minimum level of transparency is used when said determined value of the parameter (vp) represents exclusively an automated driving without any manual intervention of said driver on said steering wheel; and wherein said maximum level of transparency corresponds to total invisibility of said determined optimum trajectory and actual current trajectory; or wherein when said determined value of the parameter (vp) represents a then current exclusive manual intervention of said driver on said steering wheel without automated driving, said level of transparency is progressively increased from a first maximum value, corresponding to a partial invisibility of said determined optimum trajectory and actual current trajectory, up to a second maximum value, corresponding to a total invisibility of said determined optimum trajectory and actual current trajectory.

8. The method according to claim 2, wherein when said vehicle comprises a steering column operable by said steering wheel and by a motor capable of producing a steering torque assistance, said method comprises a step of determining a reference angle imposed on said steering wheel so that said vehicle follows said optimum trajectory based on information representative of said vehicle and an environment of said vehicle, and a step of determining a steering torque assistance to be produced as a function of a then current angle of the steering wheel and of said determined reference angle, said value of the parameter (vp) being determined as a function of said determined steering torque assistance.

9. The method according to claim 8, wherein the value of the parameter (vp) is inversely proportional to the determined steering torque assistance, such that the lower the determined steering torque assistance, the greater the said value of the parameter (vp).

10. The method according to according to claim 2, wherein said determined optimum trajectory and actual current trajectory are shown by displaying different lines on said display medium, said display medium being selected from a display screen of said vehicle and a windshield of said vehicle.

11. The method according to claim 2 wherein said determined optimum trajectory and actual current trajectory are shown by projecting different lines on said traffic lane which then comprises said display medium.

* * * * *